United States Patent [19]

Deshaw

[11] 4,286,841
[45] Sep. 1, 1981

[54] ELECTRICALLY OPERATED REMOTE CONTROL REARVIEW MIRROR

[75] Inventor: Walter R. Deshaw, Sparta, Mich.

[73] Assignee: Keeler Corporation, Grand Rapids, Mich.

[21] Appl. No.: 73,069

[22] Filed: Sep. 6, 1979

[51] Int. Cl.³ .......................... B60R 1/06; G02B 5/08
[52] U.S. Cl. ..................................... 350/289; 248/487
[58] Field of Search ...................... 350/289; 74/501 M; 248/474, 479, 487

[56] References Cited

U.S. PATENT DOCUMENTS

| 2,453,656 | 11/1948 | Bullard | 74/422 |
|---|---|---|---|
| 2,573,127 | 10/1951 | Von Bredow | 74/501 M X |
| 2,664,785 | 1/1954 | Roehrig | 350/289 UX |
| 3,027,807 | 4/1962 | Barcus et al. | 350/289 |
| 3,202,015 | 8/1965 | Moul, Jr. et al. | 74/665 |
| 3,233,475 | 2/1966 | Barber | |
| 3,251,238 | 5/1966 | Figua | 74/501 M |
| 3,421,728 | 1/1969 | Gordon | 248/477 |
| 3,459,470 | 8/1969 | Hahn | 350/289 |
| 3,628,862 | 12/1971 | Stephenson | 350/289 |
| 3,769,850 | 11/1973 | Culligan | 74/462 |
| 3,972,597 | 8/1976 | Repay et al. | 350/289 |
| 4,101,205 | 7/1978 | Bös | 350/289 |
| 4,101,206 | 7/1978 | Oskam et al. | 350/289 |
| 4,158,483 | 6/1979 | Fisher et al. | 350/289 |

Primary Examiner—F. L. Evans
Attorney, Agent, or Firm—Price, Heneveld, Huizenga & Cooper

[57] ABSTRACT

An electrically actuated rearview mirror comprises a mirror, a support housing for the mirror and means for pivotally mounting the mirror in the support housing, the mirror being pivotable about mutually orthogonal X and Y axes. A spherical gear is disposed on the back of the mirror, the spherical gear including an X gear section and a Y gear section. The X and Y gear sections are provided with spherical pitch lines. X and Y drive means mesh with the X and Y gear sections for pivoting the mirror about the X and Y axes, respectively. The X and Y gear sections and the X and Y drive means are provided with gear teeth having a roughly triangular cross section and the X and Y drive means are spring biased into engagement with the X and Y gear sections, respectively, to provide for ratchet-like adjustment of the mirror relative to the support housing in the event of a power failure.

43 Claims, 32 Drawing Figures

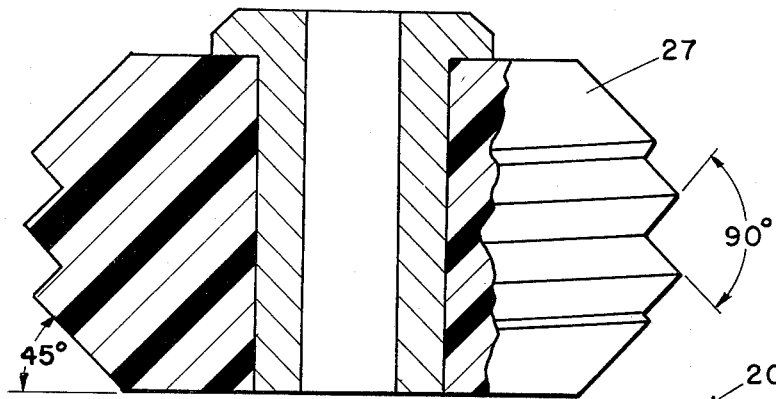
FIG 9
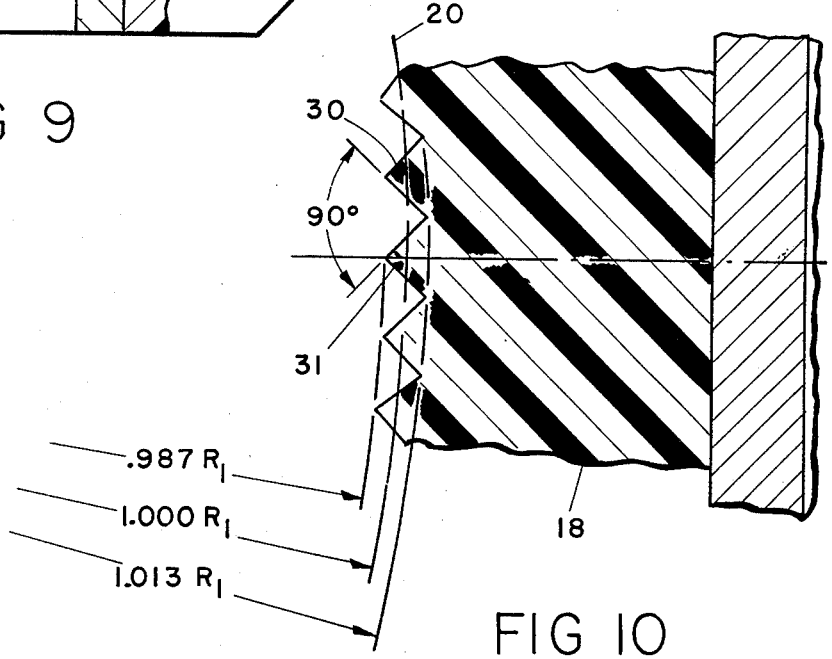
FIG 10
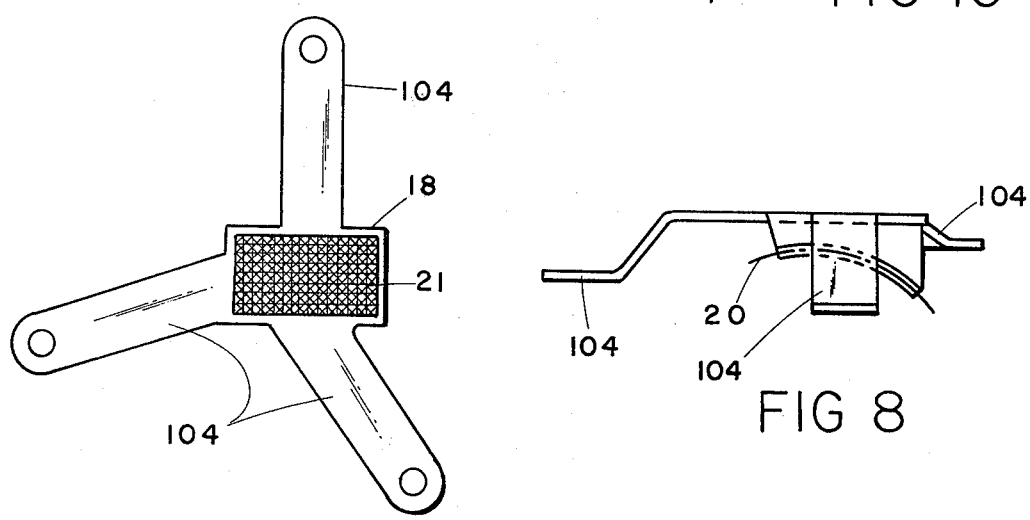
FIG 7
FIG 8

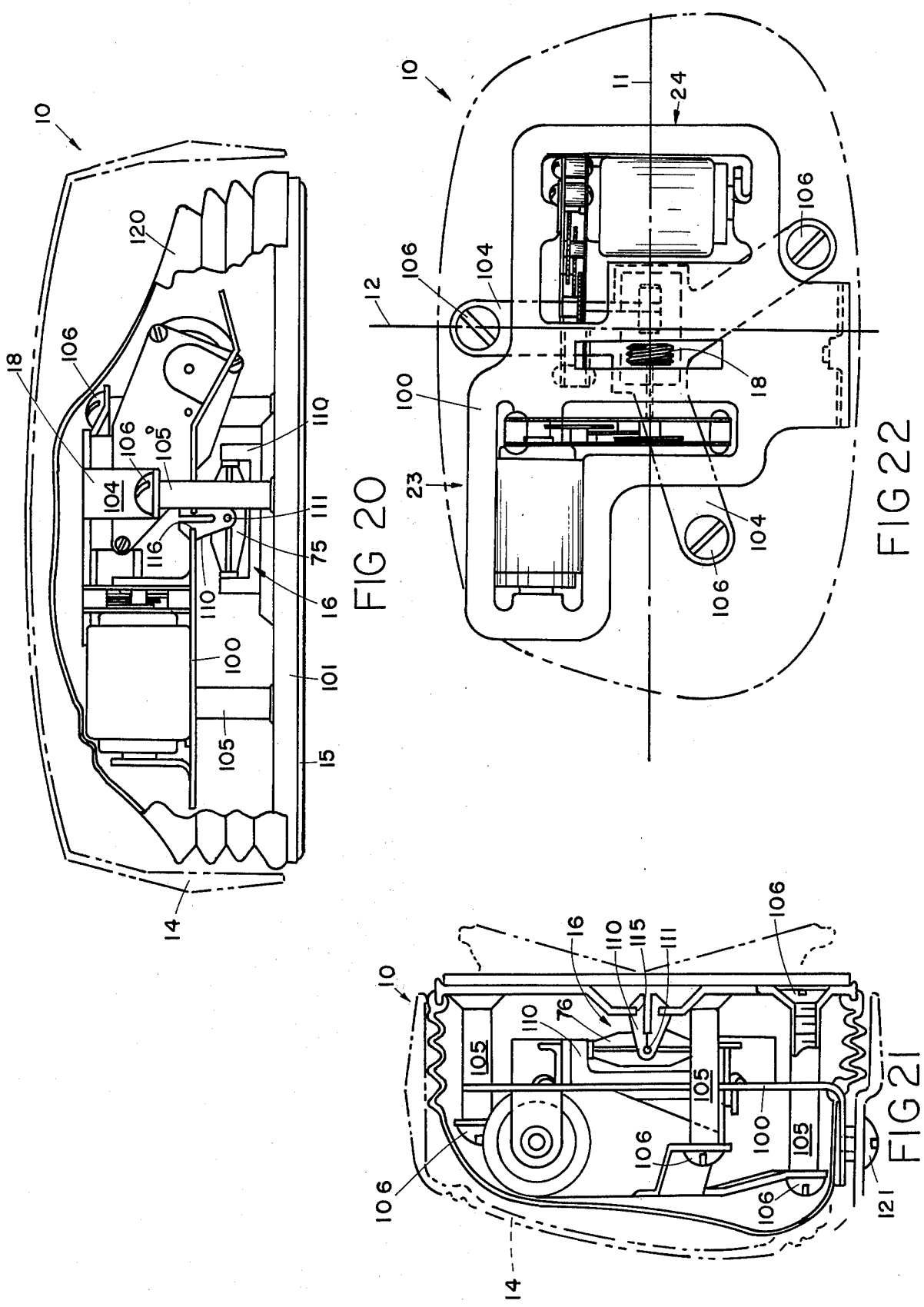

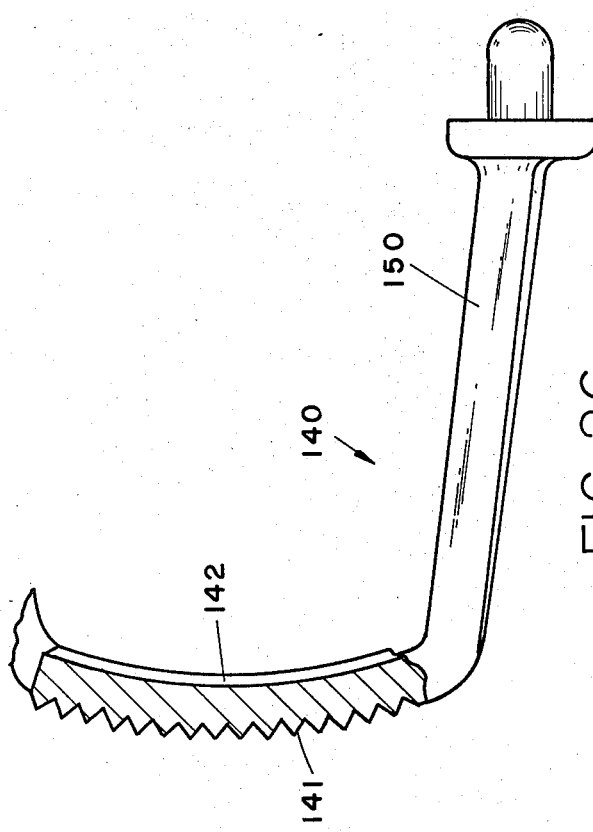
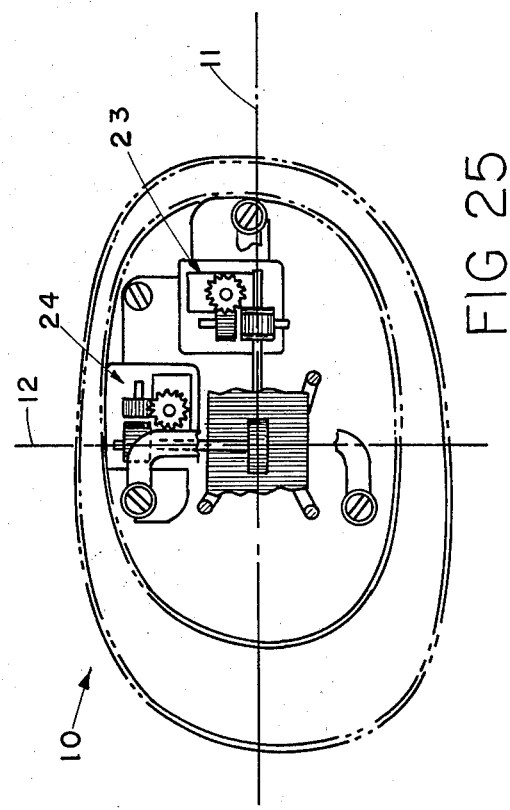
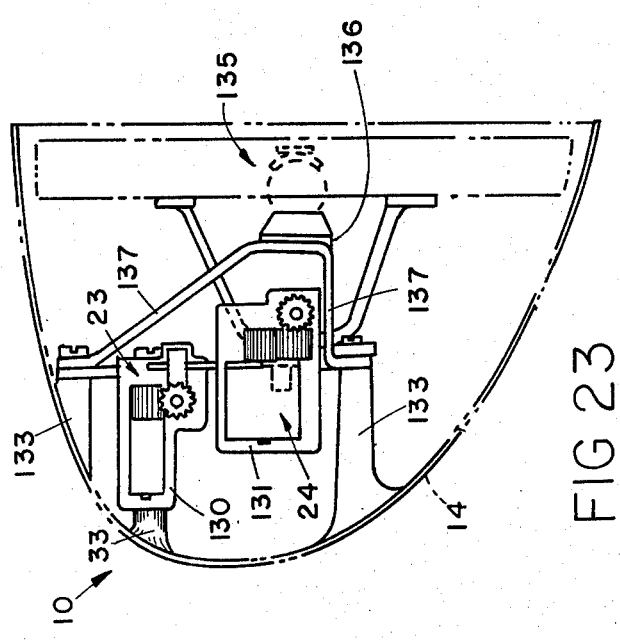
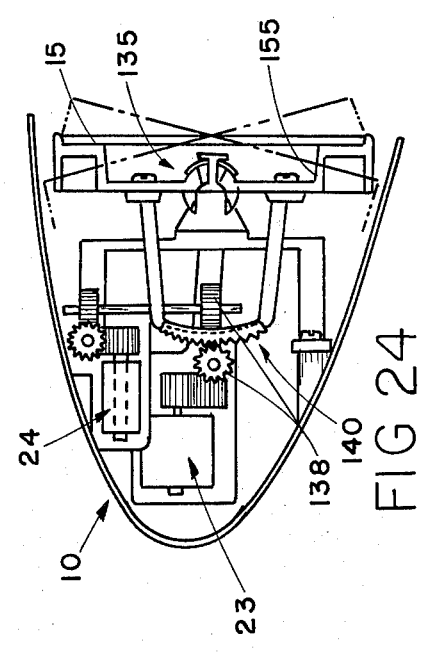

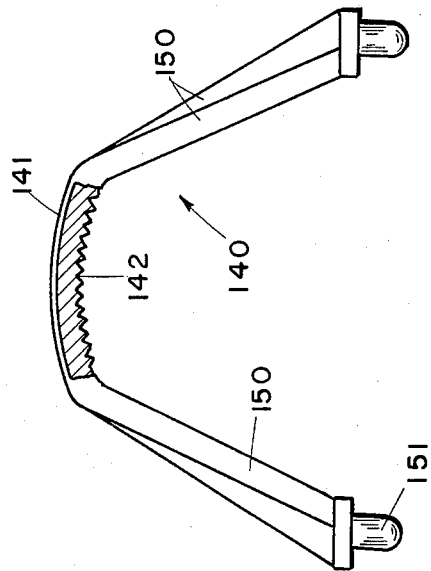
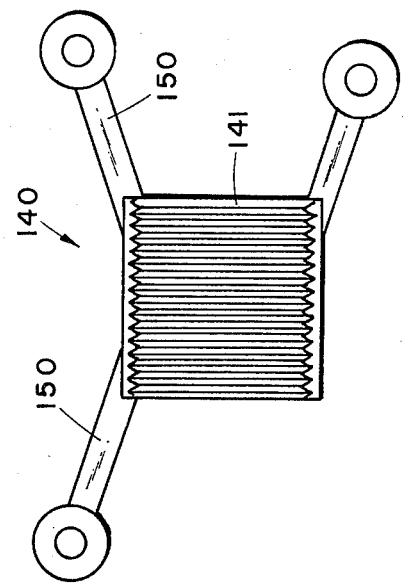
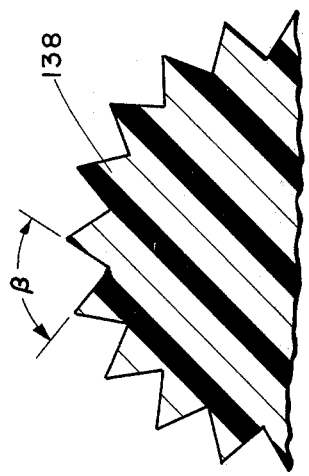
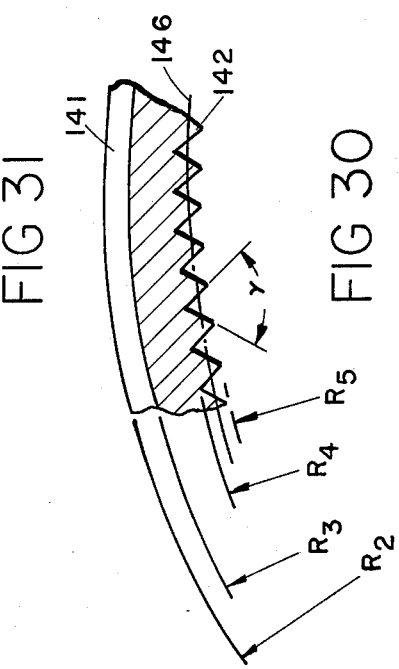

ELECTRICALLY OPERATED REMOTE CONTROL REARVIEW MIRROR

BACKGROUND OF THE INVENTION

The invention relates generally to rearview mirrors for motor vehicles and more particularly, to an electrically actuated outside rearview mirror which is universally adjustable with separate motions about mutually orthogonal axes.

Electrically actuated outside rearview mirrors for motor vehicles are known in the prior art. These mirrors are remotely operable from the interior of the vehicle by appropriate actuating switches or the like. In many cases these mechanisms only provide for the pivotable movement of the mirror or mirrors about the vertical axis. Such electrically actuated rearview mirrors are found frequently in use in trucks, buses, tractor-trailers and the like.

Electrically actuated outside rearview mirrors and similarly related devices which are adapted to be pivoted about a pair of non-colinear or orthogonal axes such as the horizontal and vertical axes are of course much more complex and costly. This added cost and complexity is a factor that has led to the popularity of mechanical cable actuated remote controlled rearview mirrors in the automotive field. The electrical actuation of outside rearview mirrors is more difficult because of the requirement of pivoting the mirrors about mutual orthogonal axes. This dictates the use of two separate electrical drive mechanisms which are operable independently of each other. Even though relatively small electrical motors are available, there are obvious difficulties in packaging the motor and associated drive train within the mirror housing in a manner that withstands extreme temperatures, vibration, shock loading, moisture, salt and other road chemicals.

A further problem associated with prior art electrically actuated rearview mirrors, is a lack of adjustability in the event of a power failure. Power failures are not uncommon in these mirrors because of the aforementioned design parameters as well as other problems associated with these mirrors and their power supplies. The lack of adjustability can cause a dangerous set of circumstances wherein the mirror has little or no utility to the operator because of its lack of adjustability to accommodate operators with varying heights and seating positions.

SUMMARY OF THE INVENTION

According to the present invention, an improved electrically actuated rearview mirror is provided of the type adapted to be selectively rotated about first and second or X and Y mutually orthogonal axes. The rearview mirror comprises a support housing, a mirror mounted within the support housing and means for pivotally mounting the mirror on the support housing, the mirror being pivotable about the X and Y axes. A spherical gear is disposed on the back of the mirror, the spherical gear including an X gear section and a Y gear section. The X and Y gear sections are provided with spherical pitch lines and in a preferred embodiment, the X and Y gear sections are overlapping or coextensive. An X drive means is provided for meshing with the X gear section and pivoting the mirror about the X axis when electrical power is applied to the X drive means. A Y drive means is provided for meshing with the Y gear section and pivoting the mirror about the Y axis when electrical power is applied to the Y drive means. The use of a spherical gear greatly simplifies the construction of the rearview mirror of the present invention as well as reducing its bulk and cost.

According to a more narrow aspect of the invention, the X and Y gear sections and the X and Y drive means are provided with gear teeth having a roughly triangular cross section. The X and Y drive means are spring biased to engagement with the X and Y gear sections, respectively. Spring biasing the X and Y drive means into engagement with the spherical gear and use of triangular or sawtooth shaped teeth as opposed to a standard involute tooth form provides for manual ratchet-like adjustment of the mirror relative to the support housing in the event of power failure.

BRIEF DESCRIPTION OF THE DRAWINGS

FIG. 7 is a front view of another embodiment of a spherical gear element employed in the electrically actuated rearview mirror of the present invention.

FIG. 8 is a top view of the embodiment of the spherical gear element illustrated in FIG. 7.

FIG. 9 is a plan view partially in section of a worm gear forming a portion of the X and Y drive means of one embodiment of the electrically actuated rearview mirror of the present invention.

FIG. 10 is a sectional view of a portion of one embodiment of a spherical gear section constructed according to the present invention.

FIG. 20 is a plan view partially in section of another embodiment of an electrically actuated rearview mirror constructed according to the present invention.

FIG. 21 is a side elevational view partially in section of the embodiment of the electrically actuated rearview mirror illustrated in FIG. 20.

FIG. 22 is a front view partially in section of the embodiment of the electrically actuated rearview mirror illustrated in FIGS. 20 and 21, with the mirror removed.

FIG. 23 is a plan view partially in section of another embodiment of an electrically actuated rearview mirror constructed according to the present invention.

FIG. 24 is a side elevational view partially in section of the embodiment of the electrically actuated rearview mirror illustrated in FIG. 23.

FIG. 25 is a front view partially in section of the electrically actuated rearview mirror illustrated in FIGS. 23 and 24, with the mirror removed.

FIG. 26 is a partial side view of a spherical gear element employed in the embodiment of the electrically actuated rearview mirror illustrated in FIGS. 23 through 25.

FIG. 27 is another side view of the spherical gear element illustrated in FIG. 26.

FIG. 28 is a front view of the spherical gear element illustrated in FIGS. 26 and 27.

FIG. 29 is a partial sectional view of the Y gear section of the spherical gear element illustrated in FIGS. 26 through 28.

FIG. 30 is a partial sectional view of an X gear section of the spherical gear element illustrated in FIGS. 26 through 28.

FIG. 31 is a partial sectional view of a pinion gear employed as the final output gear of the X and Y drive means of the electrically actuated rearview mirror illustrated in FIGS. 23 through 25.

DESCRIPTION OF THE PREFERRED EMBODIMENTS

Figure 2:
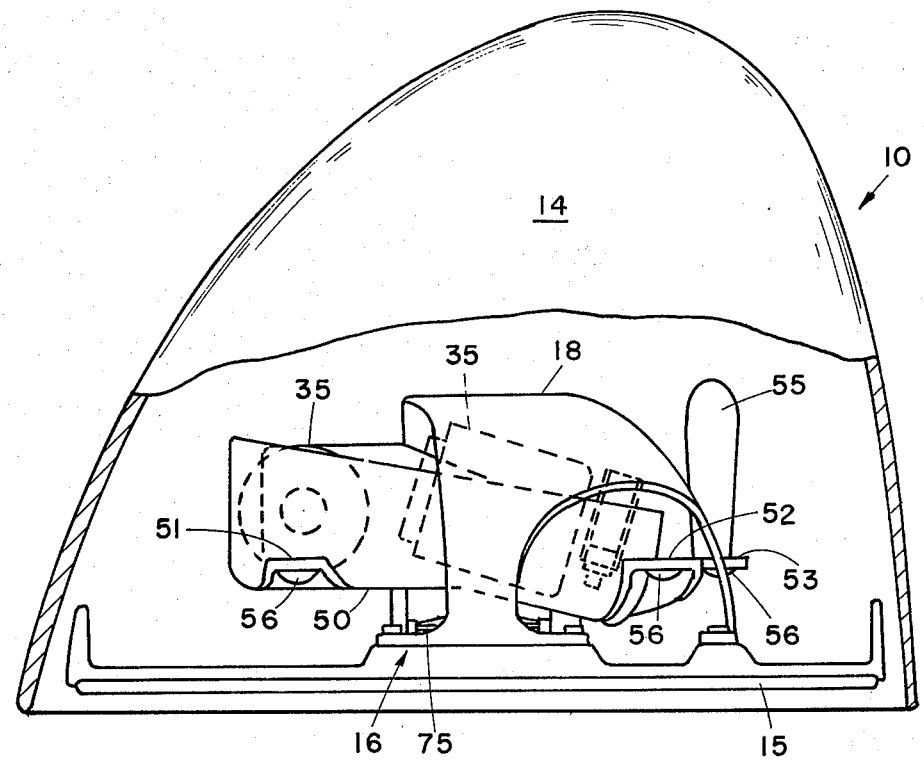
FIG. 2 is a top view, partially in section, of the electrically actuated rearview mirror illustrated in FIG. 1.
Figure 1:
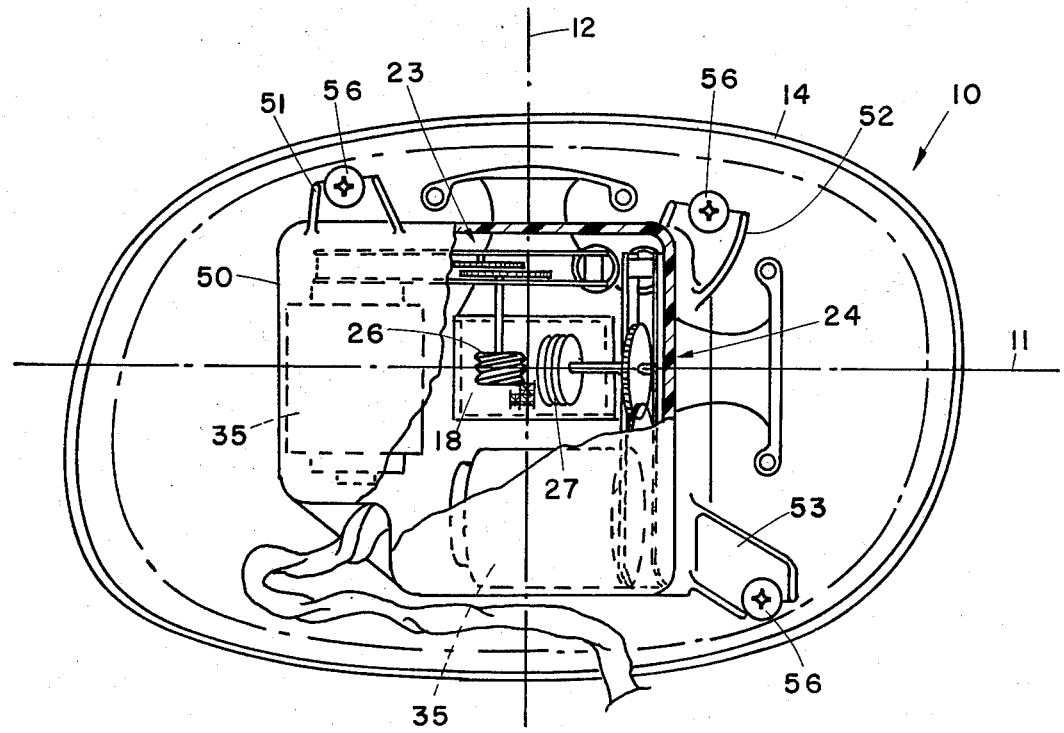
FIG. 1 is a front elevational view, partially in section, of an electrically actuated rearview mirror constructed according to the present invention with the mirror removed.
Figure 3A:
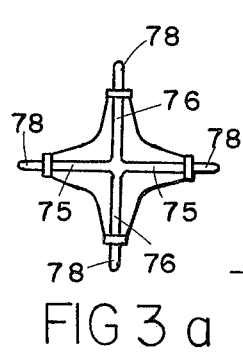
FIG. 3(a) is an elevational view of a U-joint cross constructed according to the present invention.
Figure 3:
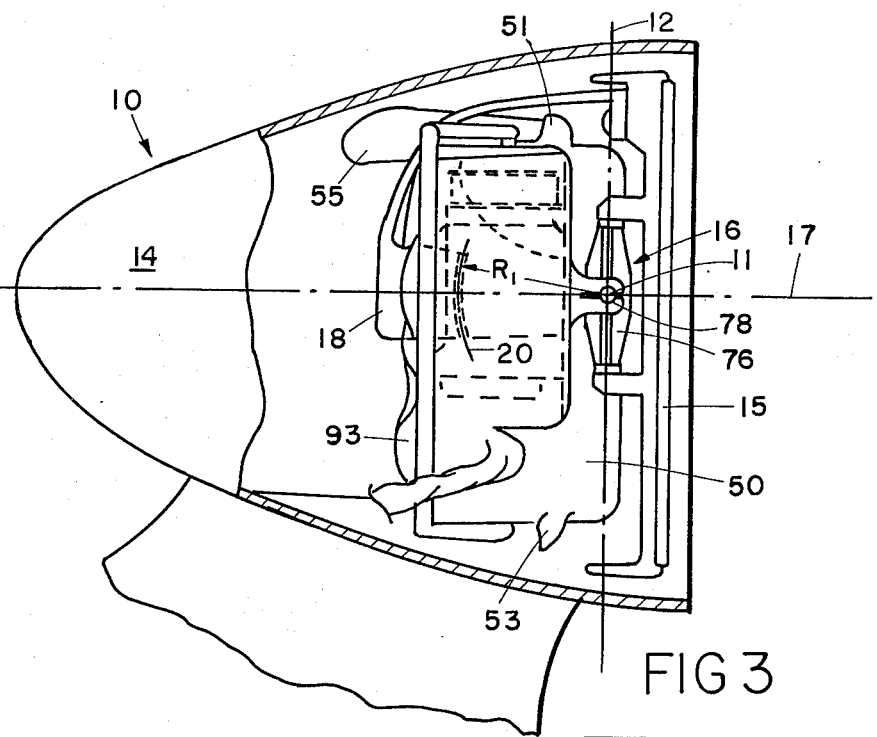
FIG. 3 is a side elevational view, partially in section, of the electrically actuated rearview mirror of FIGS. 1 and 2.
Figure 17:
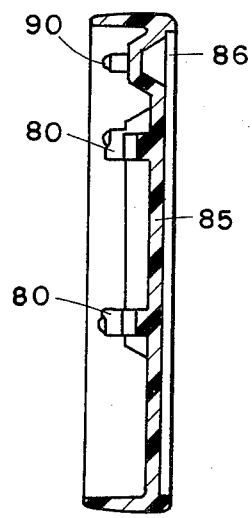
FIG. 17 is a sectional view of the mirror backing plate illustrated in FIG. 16 taken along the line XVII-XVII.
Figure 16:
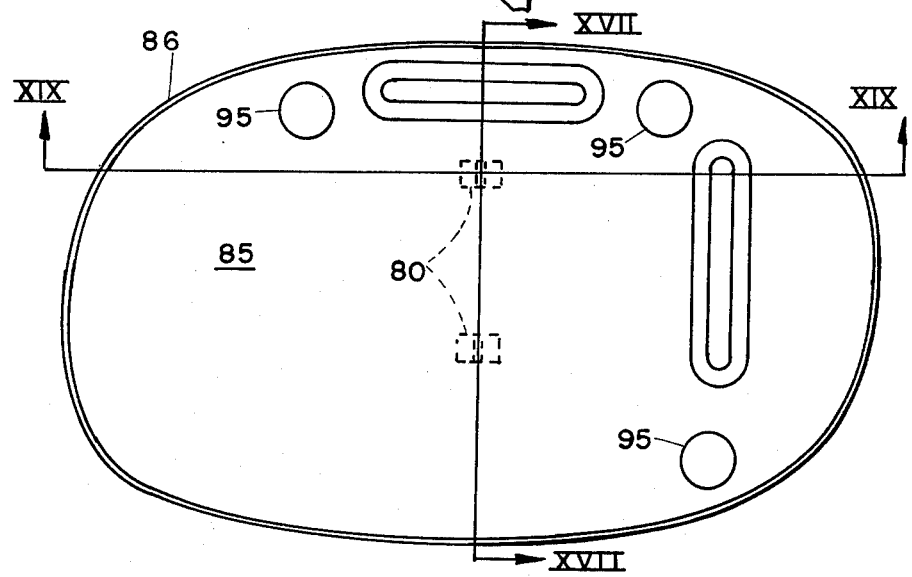
FIG. 16 is a front elevational view of a mirror backing plate constructed according to the present invention.
Figure 18:
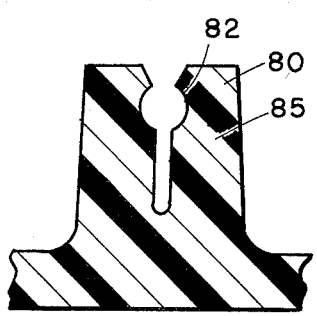
FIG. 18 is a sectional view of a bearing post constructed according to the present invention.
Figure 19:
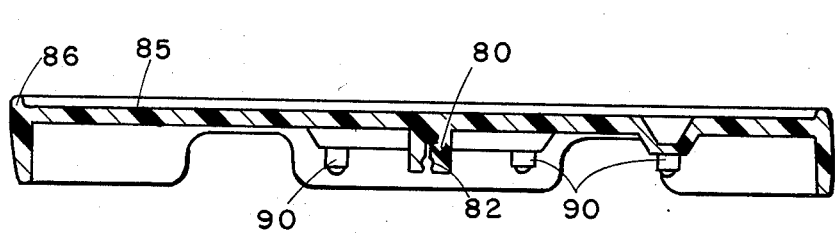
FIG. 19 is a sectional view of the mirror backing plate of FIG. 16 taken along line XIX-XIX.
Figure 6:
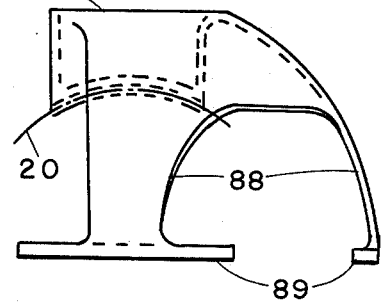
FIG. 6 is a top view of the spherical gear element of FIGS. 4 and 5.

Referring now to FIGS. 1, 2 and 3, an electrically actuated rearview mirror constructed according to the present invention is illustrated at 10. The mirror includes first and second mutually orthogonal axes 11 and 12 hereinafter referred to as the X axis and Y axis, respectively. The rearview mirror 10 includes a support housing 14 and means for pivotally mounting a mirror 15 within the housing 14 about the X and Y axes. In this case the means for pivotally mounting the mirror comprises a universal joint generally indicated by the numeral 16. The universal joint 16 provides for pivoting about the X and Y axes but holds the mirror immovable about the Z axis 17 which is mutually orthogonal thereto. A spherical gear 18 is mounted on the back of the mirror 15. The spherical gear 18 is separately illustrated in FIGS. 4, 5 and 6. The spherical gear 18 is provided with spherical pitch line or pitch sphere 20. Pitch line is conventionally referred to as the imaginary line upon which a gear rolls or translates without slippage. The pitch line of a rack gear is linear. The pitch line of a pinion gear is circular. The spherical gear 18 of the present invention is provided with a spherical pitch line or pitch sphere 20. In the present embodiment, the spherical gear 18 is provided with overlapping X and Y gear sections at 21, the overlapping X and Y gear sections having the same pitch sphere 20. An X drive means generally indicated by the numeral 23 meshes with the X gear section of the spherical gear 18 for pivoting the mirror 15 about the X axis 11. A Y drive means generally indicated by the numeral 24 meshes with the Y gear section of spherical gear 18 for pivoting the mirror 15 about the Y axis 12. The gear 18 is provided with a pitch sphere 20 having a radius $R_1$ illustrated in FIG. 3. The radius $R_1$ extends from the intersection of the X and Y axes 11 and 12. When the X drive means actuates the mirror 15, pivoting the same about the X axis 11, the Y drive means meshing with spherical gear 18 slides along the spherical Y gear section. When the Y drive means actuates the mirror 15, pivoting the same about the Y axis 12, the X drive means slides along the spherical X gear section.

Referring to FIGS. 7 and 8, a spherical gear 18 belonging to an alternate embodiment of the rearview mirror of the present invention is illustrated. The embodiment of the invention in which the spherical gear illustrated in FIGS. 7 and 8 is used, is later described in further detail. FIGS. 7 and 8, and in particular, FIG. 7, is referred to now since FIG. 7 illustrates a fully detailed view of the overlapping X and Y gear sections having a common pitch sphere 20.

The final drive elements of the X and Y gear sections 23 and 24 are worm gears 26 and 27. Referring now also to FIGS. 9 and 10, it is illustrated that the worm gears, such as worm gear 27 illustrated in FIG. 9, and the X and Y gear sections of the spherical gear 18 are provided with gear teeth having a triangular or sawtooth cross section as opposed to conventional involute cross section. Referring again briefly to FIG. 7, it is illustrated that when the X and Y gear sections overlap, provision of X and Y gear sections having triangular cross sections results in a spherical array of pyramidal gear teeth. The preferred cross-sectional configuration for the gear teeth of the X and Y gear sections is illustrated in FIG. 10. More specifically, the X and Y gear sections are constructed from gear teeth having a triangular cross section and a pitch sphere 20 having a radius $R_1$ measured from the intersection of the X and Y axes 11 and 12. In the illustrated embodiment, the addendum of the X and Y gear sections is defined by a sphere having a radius of 0.987 $R_1$ and the dedendum of the X and Y gear sections is defined by a sphere having a radius of 1.013 $R_1$. The pressure angle of each gear tooth of the X and Y gear sections is approximately 45° for an included angle between the surfaces of adjacent gear teeth, such as the teeth 30 and 31 in FIG. 10, of 90°. The final drive gears of the X and Y drive means, in this case, for example, the worm gear 27 illustrated in FIG. 9, are provided with gear teeth that match the gear teeth of the X and Y gear sections of the spherical gear 18.

Preferably, the final drive gears of the X and Y drive means, in this case worm gears 26 and 27, respectively, are spring biased into engagement with the spherical gear 18. This provides for ratchet-like manual adjustment of the mirror 15 relative to the support housing 14 in the event of a power failure. This ratchet-like adjustment is accomplished when the operator manually exerts sufficient force on the mirror 15 to cam spring biased worm gears 26 and 27 up and over adjacent teeth of the X and Y gear sections of the spherical gear 18. Whenever the operator applies sufficient force to so cam the worm gears over the spherical gear sections, the mirror moves in the direction of the applied force with a clicking action as the worm gears are cammed up and over each row of gear teeth. When the adjustment force is removed, the worm gears 26 and 27 settle in X and Y gear sections firing the mirror at the desired angular orientation.

Figure 11:
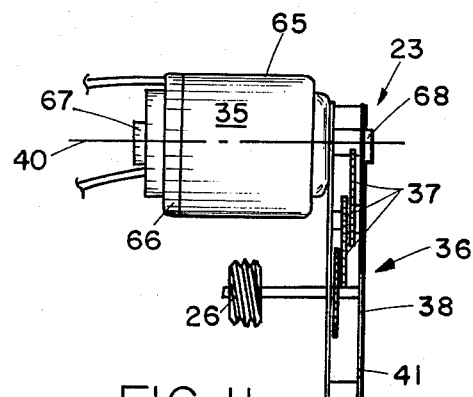
FIG. 11 is a plan view of an X or Y drive means constructed according to the present invention.
Figure 12:
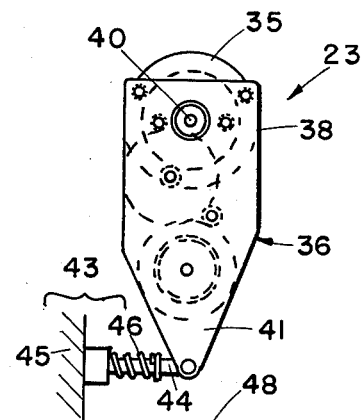
FIG. 12 is a side view of an X or Y drive means constructed according to the present invention.

Referring now also to FIGS. 11 and 12, it is illustrated that the X and Y drive means 23 and 24 each comprise an electric drive motor 35, a speed step-down transmission 36 and an output gear such as the worm gear 26 of the X drive means 23 illustrated in FIGS. 11 and 12. The speed step-down transmission 36 comprises a plurality of gear elements 37 mounted in a pivotable boom 38. The boom 38 is pivotable about the axial centerline 40 of the drive motor 35. The end 41 of the boom 38 opposite the axis 40 includes spring biasing means 43. The spring biasing means 43 comprises a rod 44 pinned to the end 41 of the boom 38 and pinned to the mirror support schematically illustrated at 45. A coil spring 46 is compressed between the boom 38 and the mirror support 45. The coil spring 46 spring biases the boom 38 in the direction of the arrow 44 urging the worm gear 26 into engagement with spherical gear 18.

Figure 15:
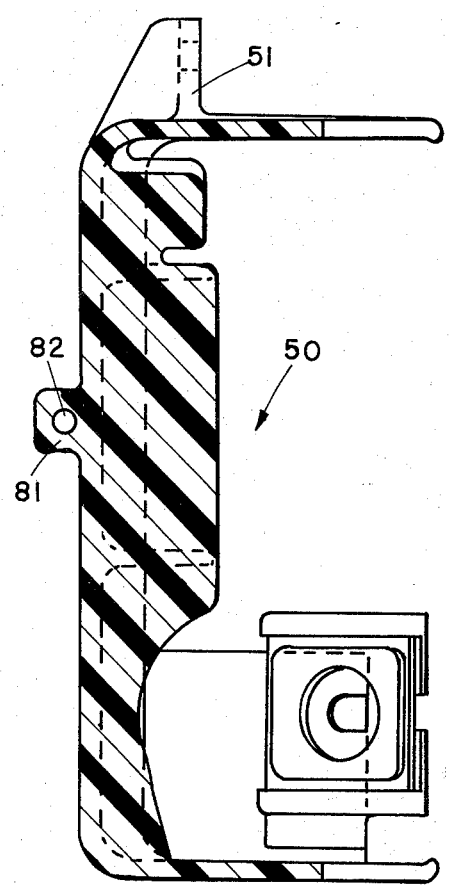
FIG. 15 is another side view partially in section of the motor case illustrated in FIGS. 13 and 14.
Figure 13:
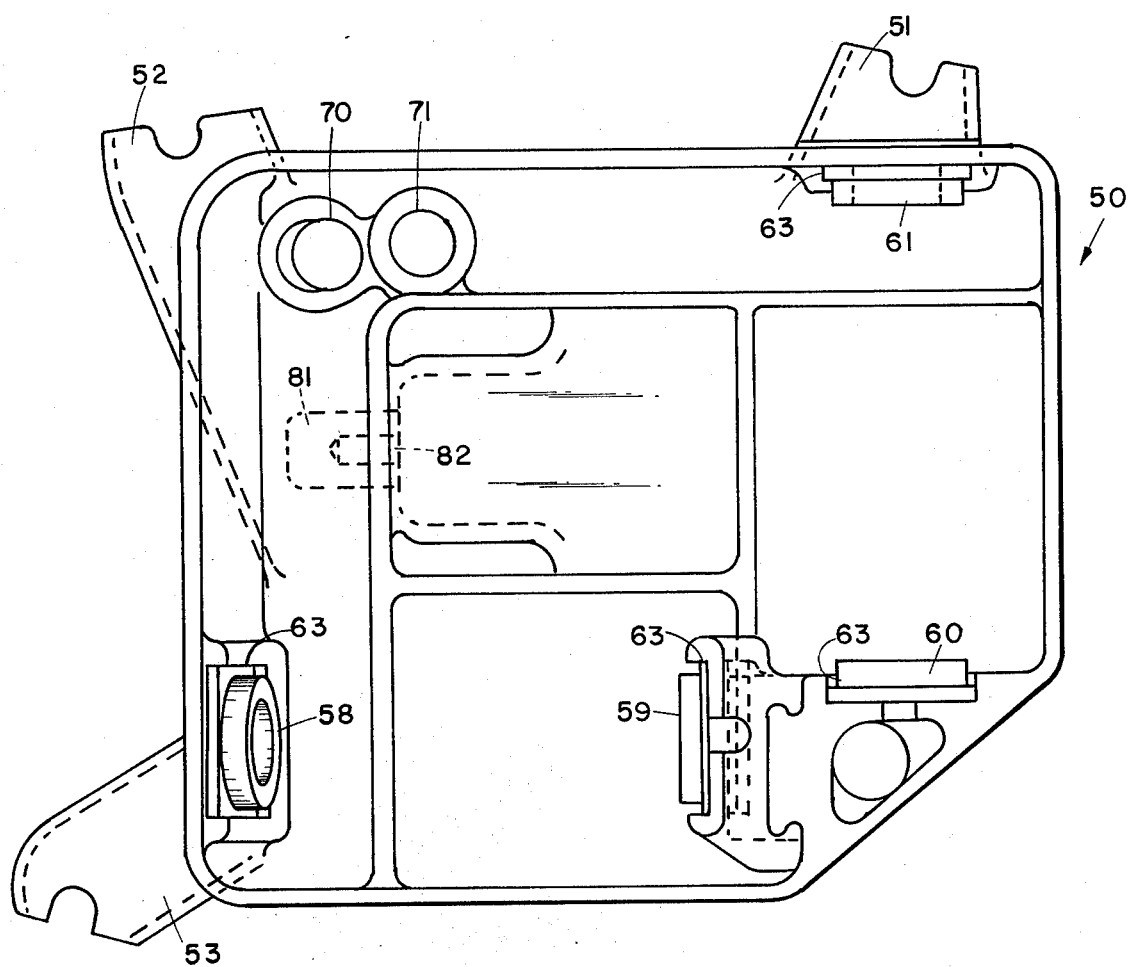
FIG. 13 is a plan view of a motor case for housing the X and Y drive means of the present invention.
Figure 14:
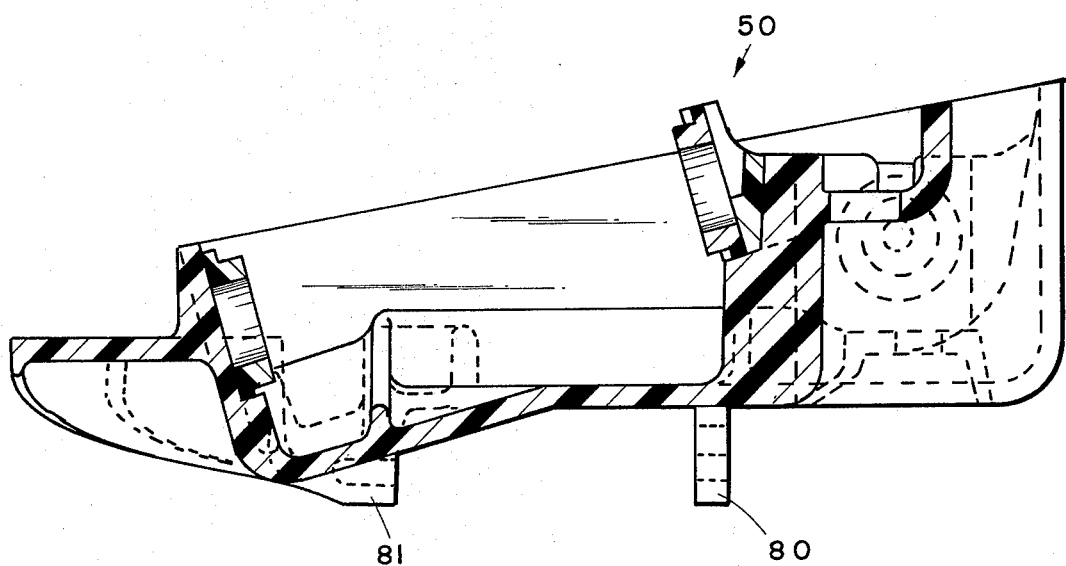
FIG. 14 is a side view partially in section of the motor case illustrated in FIG. 13.

Referring now also to FIGS. 13, 14, and 15, it is illustrated that the support housing 14 of the rearview mirror 10 preferably includes a motor case 50 adapted for mounting within the housing 14. The motor case 50 includes ears 51, 52 and 53, which are used to mount the case 50 to the support housing 14. Bosses such as the boss 55 are cast into or otherwise suitably formed within the housing 14 for accepting fasteners 56 which retain the ears 51 through 53 to the support housing 14. The motor case 50 is connected to the universal joint 16 and includes the X and Y drive means 23 and 24, respectively. The X and Y drive means are journaled in opposing pairs of motor bearings at 58 and 59 and at 60 and 61, respectively. The motor bearings 58 through 61 are received in dovetail shaped slots 63 that are integrally formed in the motor case 50. Generally, the motor case 50 is formed from a thermoplastic material and once the motor bearings 58 through 61 are inserted in the dovetail slots 63, they may be either adhesively secured and/or staked in place. The motors 35 of the X and Y drive means are preferably can type motors comprising, as best illustrated in FIG. 11, a drawn metal housing 65 with a closure member 66 covering one end thereof. The closure member 66 includes a first cylindrical post 67 that is disposed coaxial with the axial centerline 40 of the motor 35. A second cylindrical post 68 extends from the boom 38 secured to the motor 35, the second cylindrical post 68 also extending coaxially with the axial centerline 40 of the motor 35. The first and second post 67 and 68 are inserted in opposing motor bearings 58 and 59 or 60 and 61 to journal the motor 35 and the boom 38 about the axial centerline of the motor 40. The case 50 further includes first and second wells 70 and 71 in which the spring biasing rod 44 and spring 46 are housed.

The universal joint 16 is comprised of a cross member, best illustrated in FIG. 3(a), having first and second mutually orthogonal arms 75 and 76. The first and second arms 75 and 76 are coaxial with the X and Y axes 11 and 12, respectively. Bearing means comprising simple cylindrical posts 78 are disposed on opposing ends of the arms 75 and 76. Referring now also to FIGS. 16 through 19, it is illustrated that a plurality of pivot posts 80 and 81 are disposed on the back of the mirror 15 and the motor case 50. The pivot posts 80 and 81 include sockets 82 for receiving one of the bearing posts 78 of the cross members of the universal joint 16. The bearing posts 80 and 81 may be provided with a bifurcated structure, best illustrated at 80 in FIG. 18, or may be presented in the form of a solid boss, as best illustrated at 81 in FIGS. 13 through 15. Four bearing posts are provided in all, and preferably three of the bearing posts are provided with the bifurcated structure illustrated in FIG. 18. The bifurcated bearing posts 80 permit the bearing means 78 of the cross member of universal joint 16 to be received on bearing post 80 in a snap-lock fashion that greatly facilitates assembly.

Figure 4:
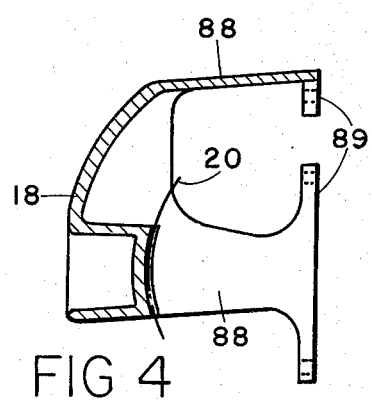
FIG. 4 is a side elevational view, partially in section, of a spherical gear element employed in the electrically actuated rearview mirror of the present invention.
Figure 5:
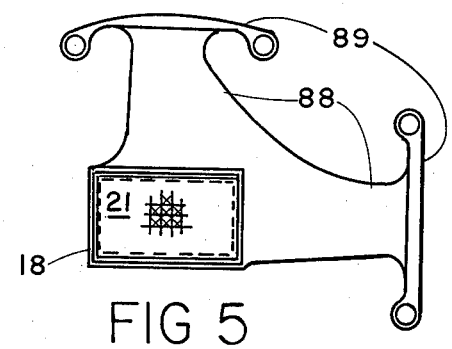
FIG. 5 is a front view of the spherical gear element of FIG. 4.

Still referring now also to FIGS. 16 through 19, it is illustrated that preferably the mirror 15 is received in a thermoplastic backing member 85. The mirror 15 is adhesively or otherwise suitably secured in a recess formed in the backing plate 85 by circumferential ridge 86. Referring now also to FIGS. 4 through 5, preferably the spherical gear 18 is disposed on a yoke including a plurality of legs 88. The yoke legs 88 include a plurality of apertured feet 89 which are secured to the back of thermoplastic mirror backing plate 85. The back of thermoplastic mirror backing plate 85 is provided with a plurality of attachment posts 90 which are registered in the apertures of apertured feet 89 and staked thereto by the application of heat. This serves to rigidly secure spherical gear 18 to the back of the mirror 15 such that the overlapping X and Y gear sections face X and Y drive means 23 and 24 and the back of mirror 15.

Assembly of the electrically actuated rearview mirror of the present invention is facilitated by the following procedure. First, the motor case 50, including X and Y drive means 23 and 24 is assembled. The cross member of universal joint 16 is then inserted in apertured bearing post 81 and then snap-locked into the three remaining bifurcated bearing posts 80 carried by bearing case 50 and mirror backing plate 85. Spherical gear 18 is then secured to the back of mirror backing plate 15 by registering attachment posts 90 in the apertures of apertured feet 89 and staking the same thereto. A rubber boot or the like illustrated at 93 in FIG. 3 may be disposed over the back of motor case 50 and around spherical gear 18 during this operation. The mirror backing plate 85, the motor case 50 and the spherical gear 18 may then be inserted and mounted in the support housing 14 as a unit. Fasteners 56 are used to connect the ears 51 through 53 of the motor case 50 to bosses formed within support housing 14. The mirror backing plate 85 includes apertures 95 through which tools may be inserted for tightening the fasteners 56 retaining the motor case 50 to the support housing 14. Thereafter, the mirror 15 may be adhesively or otherwise suitably secured to the mirror backing plate 85 in a manner that covers the apertures 95.

Referring now to FIGS. 20 through 22 an alternate embodiment of the electrically operated rearview mirror 10 of the present invention is illustrated. Functionally, the electrically actuated rearview mirror illustrated in FIGS. 20 through 22 is the same as that of the previous embodiment. The principal structural distinctions are the use of a sheet metal motor mounting plate 100 as opposed to the thermoplastic motor case 50 and the use of the sheet metal mirror backing plate 101 as opposed to the thermoplastic mirror backing plate 85. The X and Y drive means 23 and 24 are essentailly identical. The spherical gear 18 again includes overlapping X and Y gear sections which face the back of the mirror 15. The legs 104 of the spherical gear, best illustrated in FIGS. 7 and 8, are fastened to the back of sheet metal backing plate 101 with bolts 106 threadably received in opposing ends of columnar members 105. The universal joint 16 also includes a cross member comprised of orthogonal arms 75 and 76 with bearing means disposed on opposing ends thereof. However, in this embodiment the bearing means disposed on opposing ends of the arms 74 and 75 are retained in structures 110, including sockets 111 that are formed by folding the structure 110 upon itself about the ends of the arms 75 and 76 and inserting the ends of the structure in slots 115 and 116 formed in mirror backing plate 101 and motor mounting plate 100, respectively. In this embodiment, a boot 120 is provided that encompasses the entire mirror backing plate and motor plate assembly since a motor case 50 is not provided that encompasses the electric motors and other metallic components of the X and Y drive means. This assembly is secured within a support housing illustrated in phantom at 14 by a fastener 121 securing motor plate 100 to the housing 14.

Referring now to FIGS. 23 through 25, another embodiment of the electrically operated rearview mirror 10 of the present invention is illustrated. In this case, two separate motor plates 130 and 131 are provided that are mounted on bosses 133 within support housing 14. Other differences stem from the fact that a ball and socket connection 135 is used to pivotally mount the mirror 15 to the support housing 14. The ball and socket 135 is connected to the support housing 14 by a platform 136 including legs 137. The legs 137 are secured to the bosses 133 with the same fasteners used to secure motor plates 130 and 131 to the bosses 133. The X and Y drive means 23 and 24 differ from those of previous embodiments in that the final output gears 138 are pinion gears rather than worm gears. Also, the speed stepdown transmissions associated with the X and Y drive means 23 and 24 are mounted directly on motor plates 130 and 131, respecitvely, rather than on booms spring biased into engagement with the spherical gear. In this case the spherical gear comprises a member 140, best illustrated in FIGS. 26 through 28. The spherical gear 140 differs from the spherical gears 18 of previous embodiments in that the X and Y gear sections of the spherical gear 140 are disposed on opposing sides of the spherical gear member 140 at 141 and 142, respectively. As illustrated in further detail in FIGS. 29 and 30, both the X and Y gear sections 141 and 142 are provided with spherical pitch lines or pitch spheres 145 and 146, respectively. The configuration of the teeth of the X and Y gear sections and the pinion 138, illustrated in FIG. 31, is triangular or sawtooth in cross section to provide the ratcheting feature previously discussed. The radii $R_2$ through $R_5$ are all spherical radii. The angles $\alpha$, $\beta$ and $\gamma$ are a matter of choice as long as they mesh and are consistent with spherical radii $R_2$ through $R_5$. Since the X and Y drive means are not provided with spring biasing means, camming of the output gears over the X and Y gear sections must be accommodated by deflection of components of the rearview mirror assembly.

The spherical gear member 140 is supported by legs 150 having attachment posts 151 which register with apertures in the back of a mirror backing plate 155 so that spherical gear member 140 may be staked thereto.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. An electrically actuated rearview mirror comprising:
   an X axis;
   a Y axis, said X axis and said Y axis being mutually orthogonal;
   a mirror;
   a support for said mirror;
   means for pivotally mounting said mirror on said support, said mirror being pivotable about said X and Y axes;
   a spherical gear disposed on the back of said mirror, said spherical gear including an X gear section and a Y gear section, said X and Y gear sections having spherical pitch lines;
   an X drive means meshing with said X gear section for pivoting said mirror about said X axis when electrical power is applied to said X drive means; and
   a Y drive means meshing with said Y gear section for pivoting said mirror about said Y axis when electrical power is applied to said Y drive means.

2. The electrically actuated rearview mirror of claim 1 wherein said support comprises:
   a housing for enclosing the back of said mirror; and
   a motor case adapted for mounting in said housing, said motor case including said means for pivotally mounting said mirror and said X and Y drive means.

3. The electrically actuated rearview mirror of claim 1 wherein said X and Y gear sections overlap.

4. The electrically actuated rearview mirror of claim 1 wherein said means for pivotally mounting said mirror comprises a universal joint.

5. The electrically actuated rearview mirror of claim 4 wherein said universal joint comprises:
   a cross comprised of first and second mutually orthogonal arms;
   bearing means disposed on each end of said first and second arms;
   a plurality of pivot posts disposed on said support and on the back of said mirror; and
   each of said pivot posts including a socket for pivotally receiving one of said bearing means, at least one of said pivot posts having a bifurcated end for receiving one of said bearing means in a snap-lock fashion.

6. The electrically actuated rearview mirror of claim 1 wherein said means for pivotally mounting said mirror comprises a ball and socket connection between said support and the back of said mirror.

7. The electrically actuated rearview mirror of claim 1 wherein said X and Y gear sections and said X and Y drive means are provided with gear teeth having a roughly triangular cross section, said X and Y drive means being spring biased into engagement with said X and Y gear sections, respectively, to provide for ratchet-like adjustment of said mirror relative to said support in the event of a power failure.

8. The electrically actuated rearview mirror of claim 7 wherein said X and Y gear sections overlap providing an array of roughly pyramid-shaped gear teeth, said pyramid-shaped gear teeth being disposed in a spherical array.

9. The electrically actuated rearview mirror of claim 7 wherein said X and Y drive means each comprise:

an electric drive motor;

a speed step-down transmission comprising a plurality of gear elements mounted on a pivotable boom, said boom being pivotal about the axial centerline of said drive motor;

an output gear for meshing with said spherical gear; and spring biasing means for urging said output gear into engagement with said spherical gear.

10. The electrically actuated rearview mirror of claim 9 wherein said output gear comprises a worm gear.

11. The electrically actuated rearview mirror of claim 9 wherein said drive motor is secured to said boom and is pivotable therewith about its axial centerline.

12. The electrically actuated rearview mirror of claim 11 wherein said drive motor comprises a can-type motor having:

a drawn motor housing;

a closure covering one end of said motor housing, said closure including a first cylindrical post coaxial with the centerline of said motor; and a second cylindrical post extending from said boom and coaxial with the centerline of said motor, said second cylindrical post being disposed adjacent the opposite end of said motor;

said support including a motor case in which opposing ends of said motor are journaled, said first cylindrical post being received in a first motor bearing and said second cylindrical post being journaled in a second motor bearing.

13. The electrically actuated rearview mirror of claim 1 wherein said spherical gear is disposed on a yoke, said yoke including a plurality of legs extending to and secured on the back of said mirror.

14. The electrically actuated rearview mirror of claim 13 wherein one of said X and Y gear sections is disposed on said yoke facing the back of said mirror and the other of said gear sections is disposed on said yoke therebehind facing away from the back of said mirror.

15. The electrically actuated rearview mirror of claim 13 wherein said X and Y gear sections overlap and are disposed on said yoke facing the back of said mirror.

16. The electrically actuated rearview mirror of claim 13 wherein said mirror is received in a thermoplastic backing member including a plurality of attachment posts, the ends of said legs including apertured feet staked to said posts.

17. The electrically actuated rearview mirror of claim 2 wherein said means for pivotally mounting said mirror comprises a universal joint including:

a cross comprised of first and second mutually orthogonal arms, whereby said motor case may be snap-locked to said mirror with said cross therebetween.

18. The electrically actuated rearview mirror of claim 17 wherein said spherical gear is disposed on a yoke, said yoke including a plurality of legs extending to and secured to the back of said mirror, said yoke extending over said motor case.

19. The electrically actuated rearview mirror of claim 18 wherein said X and Y gear sections overlap and are disposed on said yoke facing the back of said mirror.

20. The electrically actuated rearview mirror of claim 19 wherein said mirror is received in a thermoplastic backing member including a plurality of attachment posts, the ends of said legs including apertured feet staked to said posts.

21. The electrically actuated rearview mirror of claim 20 wherein said thermoplastic backing member includes a plurality of apertures through which tools may be inserted for mounting said motor case, said yoke and said backing member, as a unit, to said housing, said backing member acting as a closure covering an open end of said housing said mirror thereafter being mounted in said backing member in a manner that covers said apertures.

22. In an electrically actuated rearview mirror of the type which is mounted for multidirectional pivotal movement about independent X and Y axes, a mirror, a support for said mirror, means for pivotally mounting said mirror for multidirectional pivotal movement on said support, said mirror being at least pivotable about said X and Y axes, an X drive means and a Y drive means, the improvement comprising:

a spherical gear operatively connected to said mirror such that displacement of said spherical gear provides a corresponding displacement of said mirror, said spherical gear including an X gear section and a Y gear section, said X and Y gear sections having a spherical pitch line, said X and Y drive means meshing with said X and Y gear sections, respectively, for driving said mirror about said X and Y axes, respectively, when electrical power is applied to said drive means.

23. The electrically actuated rearview mirror of claim 22 wherein said support comprises:

a housing for enclosing the back of said mirror; and a motor case adapted for mounting in said housing, said motor case including said means for pivotally mounting said mirror and said X and Y drive means.

24. The electrically actuated rearview mirror of claim 22 wherein said X and Y gear sections overlap.

25. The electrically actuated rearview mirror of claim 22 wherein said means for pivotally mounting said mirror comprises a universal joint.

26. The electrically actuated rearview mirror of claim 25 wherein said universal joint comprises:

a cross comprised of first and second mutually orthogonal arms;

bearing means disposed on each end of said first and second arms;

a plurality of pivot posts disposed on said support and on the back of said mirror; and each of said pivot posts including a socket for pivotally receiving one of said bearing means, at least one of said pivot posts having a bifurcated end for receiving one of said bearing means in a snap-lock fashion.

27. The electrically actuated rearview mirror of claim 22 wherein said means for pivotally mounting said mirror comprises a ball and socket connection between said support and the back of said mirror.

28. The electrically actuated rearview mirror of claim 22 wherein said X and Y gear sections and said X and Y drive means are provided with gear teeth having a roughly triangular cross section, said X and Y drive means being spring biased into engagement with said X and Y gear sections, respectively, to provide for ratchet-like adjustment of said mirror relative to said support in the event of a power failure.

29. The electrically actuated rearview mirror of claim 28 wherein said X and Y gear sections overlap providing an array of roughly pyramid-shaped gear teeth, said pyramid-shaped gear teeth being disposed in a spherical array.

30. The electrically actuated rearview mirror of claim 28 wherein said X and Y drive means each comprise:
- an electric drive motor;
- a speed step-down transmission comprising a plurality of gear elements mounted on a pivotable boom, said boom being pivotal about the axial centerline of said drive motor;
- an output gear for meshing with said spherical gear; and
- spring biasing means for urging said output gear into engagement with said spherical gear.

31. The electrically actuated rearview mirror of claim 30 wherein said output gear comprises a worm gear.

32. The electrically actuated rearview mirror of claim 30 wherein said drive motor is secured to said boom and is pivotable therewith about its axial centerline.

33. The electrically actuated rearview mirror of claim 32 wherein said drive motor comprises a can-type motor having:
- a drawn motor housing:
- a closure covering one end of said motor housing, said closure including a cylindrical post coaxial with the centerline of said motor; and
- a second cylindrical post extending from said boom and coaxial with the centerline of said motor, said second cylindrical post being disposed adjacent the opposite end of said motor;
- said support including a motor case in which opposing ends of said motor are journaled, said first cylindrical post being received in a first motor bearing and said second cylindrical post being journaled in a second motor bearing.

34. The electrically actuated rearview mirror of claim 22 wherein said spherical gear is disposed on a yoke, said yoke including a plurality of legs extending to and secured on the back of said mirror.

35. The electrically actuated rearview mirror of claim 34 wherein one of said X and Y gear sections is disposed on said yoke facing the back of said mirror and the other gear section is disposed on said yoke therebehind facing away from the back of said mirror.

36. The electrically actuated rearview mirror of claim 34 wherein said X and Y gear sections overlap and are disposed on said yoke facing the back of said mirror.

37. The electrically actuated rearview mirror of claim 34 wherein said mirror is received in a thermoplastic backing member including a plurality of attachment posts the ends of said legs including apertured feet staked to said posts.

38. The electrically actuated rearview mirror of claim 23 wherein said means for pivotally mounting said mirror comprises a universal joint including:
- a cross comprised of first and second mutually orthogonal arms,
- bearing means disposed on each end of said first and second arms;
- a plurality of pivot posts disposed on said support and on the back of said mirror; and
- each of said pivot posts including a socket for pivotally receiving one of said bearing means, at least one of said pivot posts having a bifurcated end for receiving one of said bearing means in a snap-lock fashion whereby said motor case may be snap-locked to said mirror with said cross therebetween.

39. The electrically actuated rearview mirror of claim 38 wherein said spherical gear is disposed on a yoke, said yoke including a plurality of legs extending to and secured to the back of said mirror.

40. The electrically actuated rearview mirror of claim 39 wherein said X and Y gear sections overlap and are disposed on said yoke facing the back of said mirror.

41. The electrically actuated rearview mirror of claim 40 wherein said mirror is received in a thermoplastic backing member including a plurality of attachment posts, the ends of said legs including apertured feet staked to said posts.

42. The electrically actuated rearview mirror of claim 41 wherein said thermoplastic backing member includes a plurality of apertures through which tools may be inserted for mounting said motor case, said yoke and said backing member, as a unit, to said housing, said backing member acting as a closure covering an open end of said housing, said mirror thereafter being mounted in said backing member in a manner that covers said apertures.

43. An electrically actuated rearview mirror comprising:
- an X axis;
- a Y axis, said X axis and said Y axis being mutually orthogonal;
- a mirror;
- a support for said mirror;
- a universal joint for pivotally mounting said mirror on said support, said mirror being pivotable about said X and Y axes;
- a spherical gear disposed on the back of said mirror, said spherical gear including an X gear and a Y gear section, said X and Y gear sections having overlapping spherical pitch lines;
- a yoke including a plurality of legs extending to and secured on the back of said mirror said spherical gear being disposed on said yoke facing the back of said mirror;
- an X drive means meshing with said X gear section for pivoting said mirror about said X axis when electrical power is applied to say X drive means;
- a Y drive means meshing with said Y gear section for pivoting said mirror about said Y axis when electrical power is applied to said Y drive means;
- means for spring biasing said X and Y drive means into engagement with said X and Y gear sections, respectively; and
- said X and Y gear sections and said X and Y drive means having gear teeth of roughly triangular cross section to provide for ratchet-like adjustment of said mirror relative to said support in the event of a power failure.

* * * * *